US007001137B2

(12) United States Patent
Perrin et al.

(10) Patent No.: US 7,001,137 B2
(45) Date of Patent: Feb. 21, 2006

(54) ARRANGEMENT FOR SECURING AN IMPLEMENT TO A LIFTING ARM (75) Inventors: Laurent Perrin, Bucey les Gy (FR); Emmanuel Berthod, Arc les Gray (FR); Sebastien Portet, Chargey les Gray (FR); Philippe Ostermann, Gray (FR)

(73) Assignee: Deere & Company, Moline, IL (US)

( * ) Notice: Subject to any disclaimer, the term of this patent is extended or adjusted under 35 U.S.C. 154(b) by 242 days.

(21) Appl. No.: 10/438,166

(22) Filed: May 13, 2003

(65) Prior Publication Data
US 2004/0228717 A1 Nov. 18, 2004

(30) Foreign Application Priority Data
May 17, 2002 (DE) .............................. 102 21 942

(51) Int. Cl.
*E02F 9/00* (2006.01)
(52) U.S. Cl. .................. 414/723; 37/468; 403/325
(58) Field of Classification Search ............... 414/723; 37/468; 403/324, 325
See application file for complete search history.

(56) References Cited

U.S. PATENT DOCUMENTS

| 5,179,794 A | 1/1993 | Ballinger .................... 37/117.5 |
| 5,263,810 A | 11/1993 | Takekata et al. ............. 414/723 |
| 5,466,113 A | 11/1995 | Norberg ...................... 414/723 |
| 5,890,871 A | 4/1999 | Woerman .................... 414/723 |
| 6,154,989 A | 12/2000 | Kaczmarski et al. .......... 37/444 |

FOREIGN PATENT DOCUMENTS

| DE | 36 07 257 | 10/1987 |
| DE | 43 27 942 C | 1/1995 |
| EP | 0 943738 | 9/1999 |
| FR | 2703113 | 9/1994 |
| FR | 2 776 316 A | 9/1999 |
| FR | 2830551 | 4/2003 |

*Primary Examiner*—Donald W. Underwood (57) ABSTRACT

The invention concerns an arrangement for the securing of an implement to a lifting arm, particularly to a front loader, where the implement and the lifting arm can be fastened to each other by a movable locking bar, which can be moved between a locking position and an unlocking position, and can be brought from the locking position into the unlocking position by a remotely actuated hydraulic cylinder. It is proposed that the locking bar can be arrested automatically in the unlocking position, with it then being possible for the hydraulic cylinder to be deactivated. The locking bar is located such that it can be brought into the locking position from its arrested position by moving the implement by another remotely actuated hydraulic cylinder such that the locking bar engages the lifting arm and is moved to a non-arrested position from where it is automatically biased back into its locking position. Furthermore, it is proposed that the hydraulic actuator for effecting movement of the locking bar be connected with an accumulator.

17 Claims, 4 Drawing Sheets

ARRANGEMENT FOR SECURING AN IMPLEMENT TO A LIFTING ARM

FIELD OF THE INVENTION

The invention concerns an arrangement for securing an implement to a boom or lifting arm, particularly a front loader, where the implement and the lifting arm can be fastened to each other by a movable locking bar that can be moved between a locking position and an unlocking position and can be brought from the locking position into the unlocking position by a motor actuated by external force.

BACKGROUND OF THE INVENTION

U.S. Pat. No. 5,466,113 describes an arrangement for securing an implement to a lifting arm, that includes a locking bar that can be moved manually between a locking position, in which it retains the implement at the lifting arm, and an unlocking position, in which it releases the implement. In the unlocking position, the locking bar can be arrested by pivoting it in a first direction between initial and arresting positions about a locking axis. After the attachment of an implement, it is brought into the locking position automatically by pivoting the implement under hydraulic power towards the lifting boom until the locking bar is engaged by the lifting boom and pivoted back to its initial position. However, due to the manual operation of the locking bar, the operator must move to the implement in order to unlock the locking bar. In this publication, a motorized movement of the locking bar into the unlocking position is also proposed. However, it is not disclosed how the locking bar is retained or arrested in the unlocking position in such a configuration, nor how it is to be brought back into the locking position.

Another known lifting arm arrangement is disclosed in FR 2 776 316 A. In this patent, a locking bar is moved by a hydraulic motor in order to secure an implement. To unlock the implement, a key or switch push button is actuated on a handgrip in the region of the operator's station, so that the hydraulic motor is supplied with fluid and brings the locking bar into the unlocking position. Indeed, in order to lock an implement, a further actuation of a key is necessary in order to end the supply of fluid to the hydraulic motor and to bring the locking bar into the locking position. Hence, this solution is also not operator friendly.

The problem underlying the invention is seen in the need to provide an ergonomically favorable arrangement for securing an implement on a lifting arm in which the aforementioned disadvantages have been eliminated.

SUMMARY OF THE INVENTION

According to the present invention, there is provided an improved arrangement for securing an implement on a lifting arm.

An object of the invention is to provide a locking bar arrangement which can be remotely released and then automatically moved to an arrested position.

It is proposed that the locking bar be brought from the locking position into the unlocking position by a motor actuated by external force in order to be able to remove the implement from the lifting arm. The locking bar is arrested in the unlocking position automatically, that is, without any manual effort by the operator, and the motor again deactivated, so that it does not oppose a return movement of the locking bar into the locking position. After the attachment of an implement (another or the same implement) the locking bar is again brought into the locking position by a movement of the implement relative to the lifting arm, particularly a pivoting movement.

In this way, the operator need perform only one unlocking of the implement in order to be able to remove it from the lifting arm. After the attachment of the implement, it is again secured without the need for the operator to perform a locking by depressing a key or the like.

The implement can be secured to the lifting arm in a manner known in itself by pivoting it relative to the lifting arm by means of a hydraulic cylinder. Here the locking bar interacts with the lifting arm and reaches the locking position automatically.

Although it would be conceivable to use an electric or pneumatic motor as an externally powered motor, the use of a hydraulic motor is preferred, in particular a hydraulic cylinder. Regardless of its type, the motor is appropriately controlled by a valve that can be remotely actuated from the operating position of the operator.

Lifting arm arrangements, in particular front end loaders, are attached, as a rule, to agricultural tractors so as to be removable and are connected through a series of lines with the on-board hydraulic system of the agricultural tractor. As a rule, the valves for the control of the hydraulic cylinders of the lifting arm are located on the agricultural tractor. Therefore, only a limited number of lines are available, which furthermore carry hydraulic pressure only when one of the hydraulic cylinders of the lifting arm is actuated. Independent of this fact, there is a need for pressurized hydraulic fluid for the activation of the motor actuated by external force in order to be able to bring the locking bar into the unlocking position at any desired time. According to a second viewpoint of the invention, therefore, an accumulator is provided for the supply of the externally powered motor. Thereby, one or more of the lines leading to the agricultural tractor is supplied with pressure and makes available a pressure sufficient to unlock the locking bar at any time and independent of the immediate position of the lifting arm.

The accumulator is preferably filled when it is separated from the externally powered motor. Then it is connected with the hydraulic cylinder used to move the implement. When the hydraulic cylinder is supplied with pressure and moves the implement in the direction leading to the locking, so that the locking bar reaches the locking position from the unlocking position, the accumulator is also filled. Thereby, sufficient pressure is available in order to unlock the implement again later. Alternatively or in addition, the accumulator can also be connected with another chamber of the aforementioned hydraulic cylinder or any other desired hydraulic cylinder, in order to fill it.

The externally powered motor must be brought into its rest position before an implement can be retained in a detent. Therefore, an obvious solution is to connect it with a chamber of the hydraulic cylinder which then carries no pressure-particularly over an overflow valve—when the hydraulic cylinder moves the latter in order to move the implement in the direction leading to the locking. Without remotely controlled valves and automatically thereby one after the other, the remotely powered motor will be brought into its rest position and then the locking bar retained in a detent.

Most appropriately, the locking bar is preloaded by a spring into its locking position. Thereby, an externally powered double acting motor can be eliminated that would be necessary to move the locking bar and a corresponding circuit configuration.

A lengthwise slot can be used for arresting the locking bar in the unlocking position, as it is known from DE 43 27 942 C. The lengthwise slot has a section of narrower slot width and a section of wider slot width. The locking bar can be moved relative to the lengthwise slot. A stop of the locking bar has a dimension that is greater than the narrower slot width, but is smaller than the wider slot width. If the locking bar is drawn transverse to the direction of the lengthwise slot out of the locking position into the unlocking position, then the stop moves out of the lengthwise slot and is moved along beside the lengthwise slot, by the force of a second spring. In particular, the stop is rotated. After the externally powered motor is deactivated, the stop comes into contact with the section of the lengthwise slot with the smaller dimensions; there it is arrested in the unlocking position. After the reattachment of an implement, it is conditioned by the movement of the lifting gear, at which time the locking bar makes contact with another element, and is again brought to the section of the lengthwise slot with wider slot width. There, the locking bar is moved by the spring into the detent position.

A second spring, that brings the locking bar into a position in the unlocking position in which it is arrested, can also be applied to any other desired arrangement for the arresting of the locking bar. In place of a spring, a weight or a further motor actuated by external force can be used to arrest the locking bar in the unlocking position.

There are ranges of lifting height in which an activation of the externally powered motor for the unlocking of the locking bar is not useful. In such regions of lifting height, a corresponding input from the operator is appropriately ignored in order to reduce the danger of accidents. In a preferred embodiment, in a range of positions of the lifting arm, in which the input for the releasing of the implement is ignored, can be defined by the operator. For this purpose, numerical inputs can be provided, or the lifting arm is brought into a position that is then stored in memory following a corresponding input. Several such regions may also be defined. A sensor detects the position of the lifting arm and a control arrangement comprising the sensor, the push-button switch, and the valve, which is connected to the sensor for the control of the motor and activates the valve only in the regions of position of the lifting arm that are permitted.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
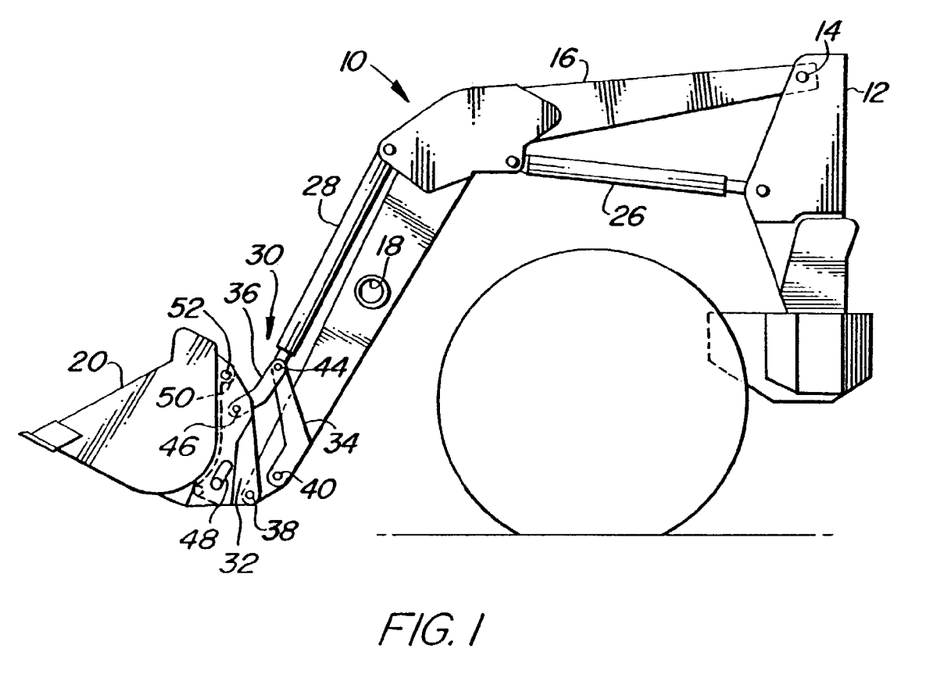
FIG. 1 is a schematic, left side elevational view of a front-end loader equipped with a loader boom to which is attached an implement.

A lifting arm or device 10 shown in FIG. 1 is attached to the front side of an agricultural tractor that is only fragmentarily indicated. The lifting arm or device 10 includes a mast 12 that is shown and that engages in a bearing 14 a lifting boom 16 that is reinforced due to its double-armed configuration by means of a transverse tube 18. An implement 20, here shown as a bucket, but which may be, for example, an earth scoop, a manure fork, a bale fork or a pallet fork, is connected so as to be movable and easily replaced, to the front end of the lifting boom 16 by means of a positioning arrangement 30, described below, and an implement holder 32. In order to raise the implement 20, the lifting boom 16 is pivoted about the bearing 14 by hydraulic motors 26. In order to reposition the inclination of the implement 20, a further hydraulic motor 28 engages with one end the repositioning arrangement 30 and with its other end the lifting boom 16. The repositioning arrangement 30 acts upon the implement holder 32, to which the implement 20 is connected directly, and is composed generally of first and second pivot arms 34 and 36, respectively, that are connected to each other in a joint, where the hydraulic motor 28 engages the joint 44. The implement holder 32 is supported in bearings 38 and the first pivot arm 34 is supported in bearings 40 on the lifting boom 16, free to pivot. The second pivot arm 36 is connected to the implement holder 32, free to pivot, in a bearing 46. The number call-out 48 identifies a locking bar that is explained in greater detail below. In the upper section of the implement holder 32, a hook 50 and a pin 52 are provided that bring the implement 20 into engagement with the lifting arm or device 10.

Figure 2:
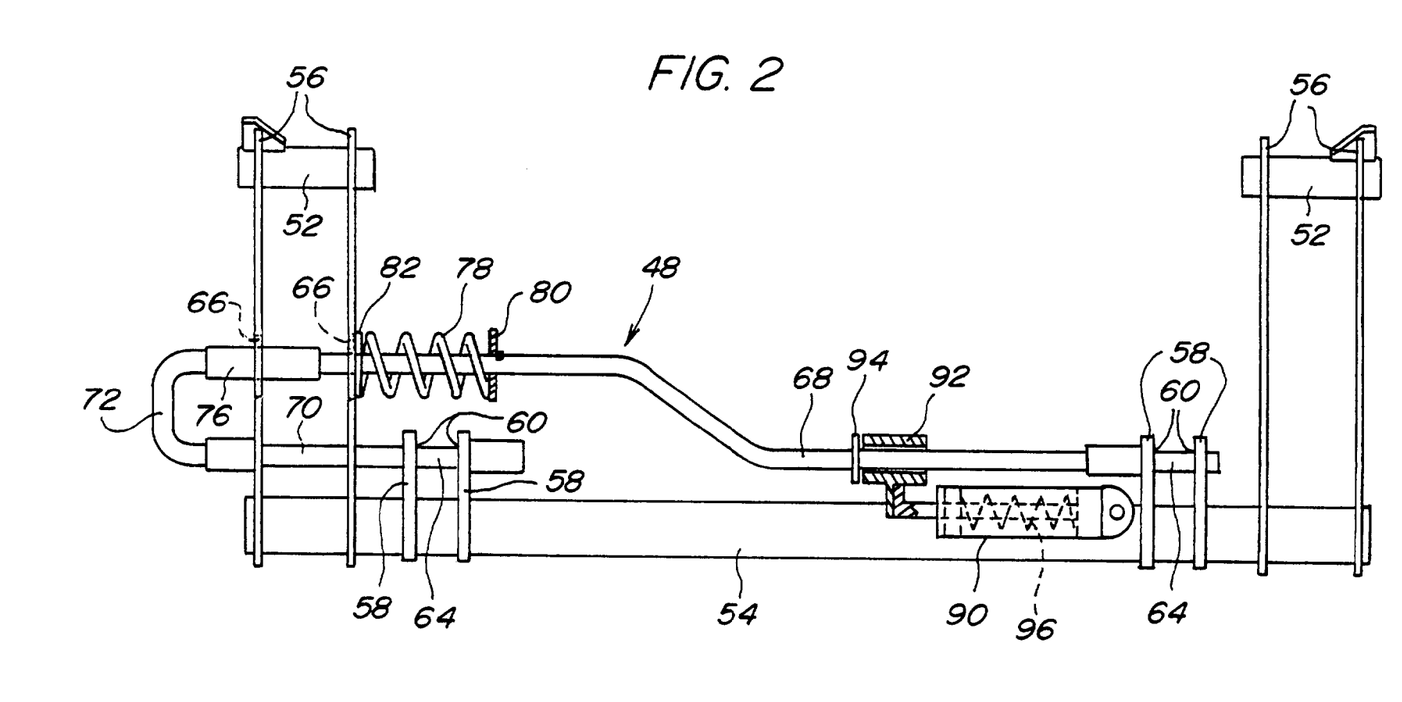
FIG. 2 is a front view of an arrangement for securing the implement to the implement holder.

According to FIG. 2, the implement holder 32 is composed on its underside by a transverse bar 54 extending over the entire width, and by walls 56, in each case arranged in pairs, that are penetrated by the end sections of the transverse bar 54 and are welded to it.

Two brackets 58 project radially and parallel to each other from the side of the transverse bar 54 facing the implement 20 and contain openings 60 that are aligned with each other. The openings 60 are used to engage pin-shaped locking segments or parts 64 formed by respective end regions of the locking bar 48, by means of which the implement 20 is fastened to the implement holder 32 and with it to the lifting arm or device 10. On the side facing the implement holder 32, the implement 20 is also provided with brackets with such openings, although not shown, that can be brought into alignment with each other and through which the locking segments 64 of the locking bar 48 can be inserted.

The double walls 56 on each side of the holder 32 carry in their upper corner region the pins 52 that engage the hooks 50. Below and offset to the rear from the pins 52 are the bearings 46, and in the right lower end region of the holder 32 are the bearings 38 for the connection to the lifting boom 16 (see FIG. 3). Beyond that, in each of the walls 56, located at the left in FIG. 2, are two lengthwise slots 66 machined in transverse alignment with each other and whose centerline is located on a circular arc about the center of the openings 60. The lengthwise slot 66, of the inward or right one of the left pair of walls 56 in FIG. 2, is provided with an approximately constant slot width over its length. The lengthwise slot 66, of the outward or left one of the left pair of walls 56 in FIG. 2, is provided in a lower section with a narrow slot width and in an upper section with a wider slot width.

The locking bar 48 is manufactured from steel rod and has the general shape of a "J", with a first, long leg 68, a second, short leg 70, and a handgrip 72 that bridges a gap between these two legs.

Between the handgrip 72 and the end region defining a right locking part 64, the first, long leg 68 is bent at two places in opposite directions through approximately 30° and is constantly guided with the locking part 64 in the opening 60 of the inner bracket 58 on the right side. The section of the long leg 68, located opposite the locking part 64 and offset radially from it, extends through both lengthwise slots 66 and carries a stop 76 formed as a sleeve that extends only halfway to the left and the right of the outer wall 56 in the locking position of the locking bar 48, as shown in FIG. 2. The length of the section of the stop 76 that extends into the space between the two walls 56 corresponds generally to the repositioning path of the locking bar 48 for the locking or unlocking of the implement 20. The outside diameter of this stop 76 is smaller than the wider slot width, but is larger then the narrower slot width of the outer lengthwise slot 66. Inside, or to the right of the inner left wall as seen in FIG. 2, the long leg 68 is surrounded concentrically by a spring 78, which is in contact under a preload on the one hand with a disk 80 fastened to the long leg 68 and at its other end with a disk 82 that is in sliding contact with the wall 56, where the diameter of the disk 82 is larger than the width of the lengthwise slot 66 in its widest section.

The handgrip 72 is perpendicular to, and has opposite ends respectively joined to, the long and short legs 68 and 70 of the bar 48 and is located outside the outer, left wall 56 so as to be easily accessible to an operator.

The short leg 70 extends parallel to the long leg 68 in its region up to the bend forming the junction between the handgrip and short leg 70, and extends through the openings 60 of the left side and corresponding aligned bores 74 in the left walls 56. Guides in the form of sleeves may be fixed to the walls 56 in surrounding relationship to the short leg 70 if necessary or desired. The short leg 70 is also provided with an end section that includes a locking segment 64 which is constantly guided in the opening 60 of each left bracket 58.

The spring 78 is configured as a helical compression spring and assembled and loaded in such a way that it constantly forces the locking bar 48 to the right, as viewed in FIG. 2, so that the locking segments 64 extend through all brackets 58.

In addition, a remotely operable hydraulic motor 90, here shown in the form of a single-acting hydraulic cylinder, is provided with its cylinder extending in the longitudinal direction of, and being fastened to, the transverse bar 54. The piston of the hydraulic motor 90 is connected with a sleeve 92 that encloses the long leg 68 of the locking bar 48 in the vicinity to the left of the right pair of brackets 58, shown in FIG. 2. The sleeve 92 is arranged near a right surface of a disk 94 that is rigidly connected to the long leg 68. The piston of the hydraulic motor 90 is arranged to shift the sleeve 92 to the left from the rest position, shown in FIG. 2. In this way, there is a possibility of bringing the locking bar 48 under remote control into an unlocking position. A further spring 96 is arranged between the rod end of the cylinder and the piston of the hydraulic motor 90, which biases or preloads the piston in the direction of the head end of the cylinder; that is, it endeavors to shift the piston rod, and hence, the sleeve 92 to the right, as viewed in FIG. 2.

As seen in FIG. 2, it is clear that the locking bar 48 can be grasped manually at the handgrip 72 and shifted to the left against the force of the spring 78, so that both locking segments 64 can be drawn out of each of the right brackets 58 of each pair of brackets 58 so as to free the space between both brackets 58 of each pair of brackets 58 for taking up or freeing the associated bracket on the back side of the implement 20, and thereby unlocking or freeing the implement 20 from the implement holder 32. During this manual operation, the sleeve 92 slides on the long leg 68 of the locking bar 48, and the piston of the hydraulic motor 90 remains stationary.

Figure 3:
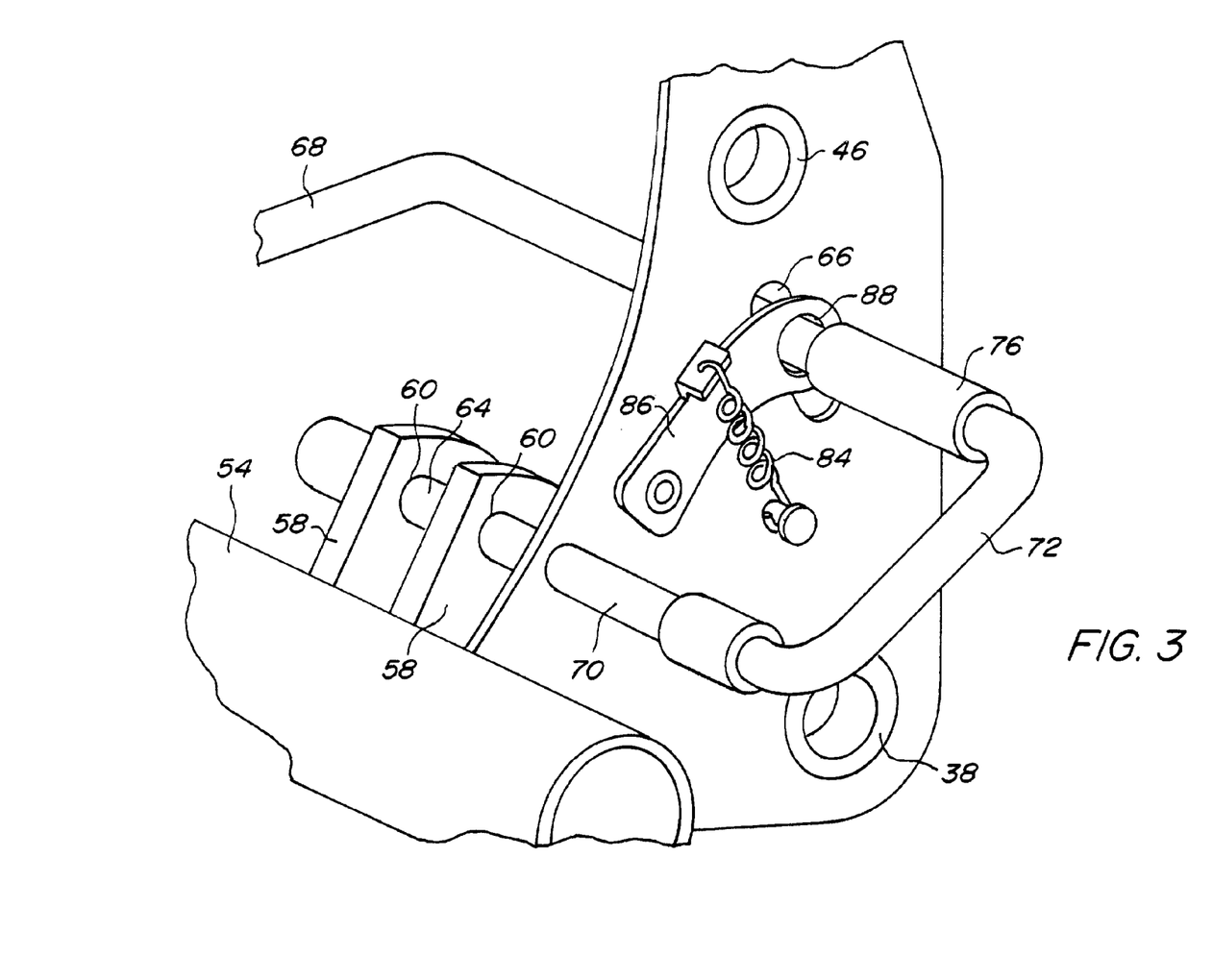
FIG. 3 is a perspective side view of the left part of the arrangement of FIG. 2.

In FIG. 3, the outer left wall 56 of the implement holder 32 has been removed for the sake of clarity. As can be seen in FIG. 3, a second spring 84 interacts with the locking bar 48. Specifically, the spring 84 has one end fastened to the inner left wall 56 and its other end fastened to a rocker or lever 86 that is pivotally attached to the inner wall 56 so as to pivot freely about an axis of rotation extending parallel to the transverse bar 54. The long leg 68 of the locking bar 48 penetrates an opening 88 in the rocker 86. In this way, the spring 84 draws the long leg 68 downward or clockwise, as viewed in FIG. 3, as soon as the stop 76 has been drawn out of the lengthwise slot 66, so that the long leg 68 reaches the narrower-width region of the lengthwise slot 66. The stop 76 thus abuts the outer left wall 56 and arrests the locking bar 48 from moving from its unlocking position. Accordingly, the arrested locking bar 48 may be released during manual actuation.

If the implement holder 32 is to be prepared to take up an implement 20, the locking bar 48 can also be drawn manually outward into the unlocking position, as described above, where it is drawn by the second spring 84 in a clockwise direction about the axis extending through the opening 60, as seen in FIG. 3, so that the stop 76 is moved on the outside of the left outer wall 56 into the region of the narrower slot width of the lengthwise slot 66.

Thereby, the spring 78 is further compressed or loaded and the locking bar 48 is retained in the unlocked position. Following this, the implement 20 can be taken up and raised by the pin or pins 52 and the hook or hooks 50, so that each bracket on the back side of the implement 20 respectively reaches between one of the pair of brackets 58 on the transverse bar 54 and all openings 60 are aligned with each other. Finally the implement 20 is tilted towards the lifting boom 16 by actuation of the hydraulic motor 28 so that the stop 76 is brought into contact with the lifting boom 16, and together with the long leg 68, is pivoted into the region of the wider slot width of the elongate slot 66. Once it has reached that point, the stop 76 enters the slot 66 with the loaded spring 78, then acting to shift the entire locking bar 48 to the right, as seen in FIG. 2, so as to once again cause the two locking segments 64 to penetrate all brackets and secure the implement 20 to the holder 32.

On the other hand, for the unlocking or freeing of the implement 20, the hydraulic motor 90 can also be activated from the operator's station on the agricultural tractor so that its piston brings the sleeve 92 into contact with the disk 94 and shifts the disk 94, together with the entire locking bar 48, to the left. The locking segments 64 free the brackets of the implement 20. Since the stroke of the piston of the hydraulic motor 90 is sufficiently large to extract the stop 76 from the lengthwise slot 66 of the outer wall 56, this frees the locking bar 48 to be rotated by the action of the second spring 84 so as to place the inner end of the stop 76 in alignment with the narrow part of the elongate slot 66, thereby arresting the locking bar in its unlocking position. At first, the hydraulic motor 90 remains supplied with pressurized fluid. Following this, the implement 20 can be separated from the implement holder 32 by resting the implement 20 on the ground and rotating the holder 32 so as to disengage the pins 52 from the hooks 50 by actuation of the further hydraulic cylinder 28. Once the implement 20 is detached, the cylinder 28 may be actuated to once again bring the long leg 68 of the locking bar 48 into contact with the boom 16 so as to cause the bar to rotate and dispose the stop 76 in alignment with the wide part of the elongate slot 66. The hydraulic motor 90 then is returned to its rest position by the action of the springs 78 and 96. It would also be conceivable to omit the spring 96 and to bring the hydraulic motor 90 into its rest position just by the action of the spring 78.

In another embodiment, the stroke of the hydraulic motor 90 can be selected in such a way that it is not adequate to extract the stop 76 from the lengthwise slot 66 of the outer wall. The hydraulic motor 90 remains in this position or is moved again into the rest position in order to expose the piston of the hydraulic motor only for a short time to the environmental influences. Therefore, in this embodiment the locking bar 48 is not arrested in the unlocking position. However, if a new implement is to be attached, the hydraulic motor 90 can extract the stop 76 out of the lengthwise slot 66 of the outer wall 56 later, for example, before or during the tilting movement of the implement 20 for the locking, so that the locking bar 48 is retained in a detent in the unlocking position. It would also be conceivable to extend the hydraulic motor 90 only so far that it permits the attachment of the implement, but does not permit it to be locked in place. Subsequently, the implement is locked in place by disconnecting fluid pressure from the hydraulic motor 90 such that the springs 78 and 96 shift the locking bar 48 to its locking position and the hydraulic motor 90 to its rest position.

The coupling arrangement composed of the sleeve 92 and the disk 94 between the motor 90 and the locking bar 48, makes it possible to actuate the locking bar 48 by the motor 90 and independent thereof manually. The spring 78 permits the use of the coupling arrangement on a single-acting hydraulic cylinder as a hydraulic motor 90.

Figure 4:
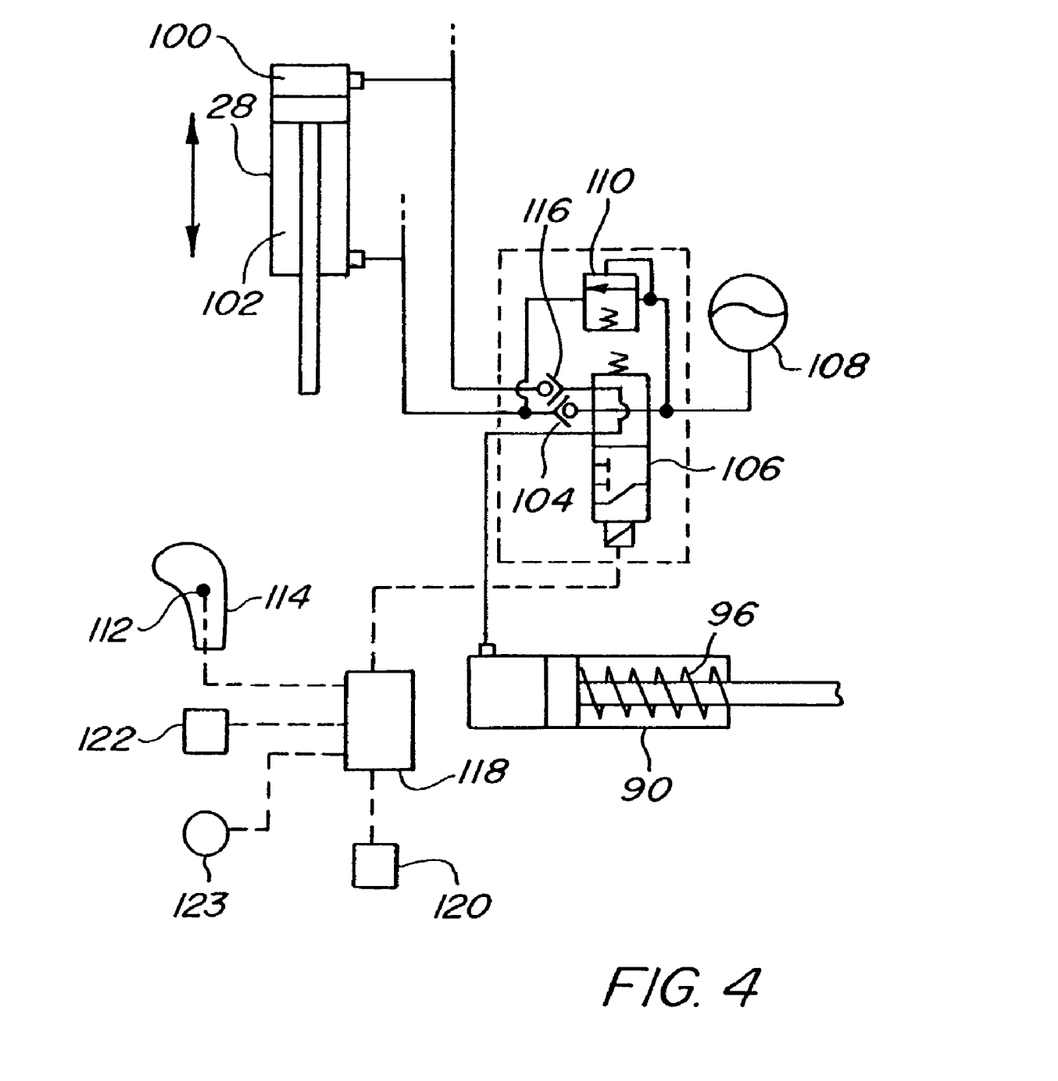
FIG. 4 is a schematic hydraulic circuit for operating actuators shown in FIGS. 1 and 2.

FIG. 4 shows a hydraulic circuit diagram on the basis of which the control of the hydraulic motor 90 shall be explained below. The further hydraulic cylinder 28, used to reposition the inclination of the implement 20, is a double-acting cylinder whose piston chamber 100 and piston rod chamber 102 can be connected by appropriate lines, not shown, with the operating hydraulic system of the agricultural tractor. The valves for the control of the hydraulic cylinder 28 as well as a valve for the control of the single-acting hydraulic cylinder 26 are located on the agricultural tractor. Hence, three removable hydraulic lines lead to the lifting arm or device 10. The elements shown in FIG. 4 are all arranged on the lifting arm or device 10. Furthermore, a removable electric connection is provided between the agricultural tractor and the lifting arm or device 10 for the control of a solenoid or electro-magnetically controlled switching valve 106.

When the piston rod chamber 102 is supplied with pressurized fluid, the implement 20, together with the implement holder 32, rotate in the clockwise direction about the bearing 38, as seen in FIG. 1 (to the rear against the direction of operation of the agricultural tractor). If the piston chamber 100 is supplied with pressurized fluid, the implement rotates analogously to the front for unloading. In each case, whichever of the chambers 100 and 102 that is not supplied with pressurized fluid is connected by the valves provided on the agricultural tractor with a tank to contain the excess hydraulic fluid.

The piston rod chamber 102 is connected, over a check valve 104 and an electro-magnetically controlled switching valve 106, with an accumulator 108. If the switching valve 106 is in the rest position shown in FIG. 4, hydraulic fluid flows over the check valve 104 into the accumulator 108, as soon as the pressure in the piston rod chamber 102 is higher, by a certain pressure difference than the pressure existing in the accumulator 108. Upon the pivoting of the implement 20 to the rear, which leads to the locking bar 48 being pivoted from its unlocked arrested position from where it is biased into the locking position, the piston of the hydraulic actuator 28 bottoms out and the pressurized fluid goes to fill the accumulator 108. It would also be conceivable to connect the accumulator 108 over a further check valve with the piston chamber 100 of the further hydraulic cylinder 28.

The piston chamber of the hydraulic motor 90 is connected, in the rest position of the switching valve 106, over a check valve 116 with the piston chamber 100 of the hydraulic cylinder 28 and thereby with the tank. Thereby, the hydraulic motor 90 is not supplied with pressurized fluid so that it moves to the rest position, shown in FIG. 2, when the piston chamber 100 is not under pressure, which is the case when the implement 20 is tilted towards the lifting boom 16 so as to release the bar 48 for locking the implement to the holder 32. If subsequently, the pressure in the piston chamber 100 again rises, then the check valve 116 prevents a pressure increase in the piston chamber of the hydraulic motor 90.

By means of a push-button switch 112, that is attached to a handgrip 114 of a control handle that is located at the operator's platform on the agricultural tractor for the control of the hydraulic cylinders 26 and 28, an electric current may be coupled over an electrical control unit 118 for actuating the switching valve 106 for movement into its operating position in which the accumulator 108 is connected with the piston chamber of the hydraulic motor 90. Thereby, the hydraulic motor 90 is extended and the locking bar 48 is moved into its unlocking position, from where it is rotated by the second spring 84 into its position where it is arrested by the stop 76. Then the electrical control unit 118 automatically acts to terminate the flow of current to the switching valve 106 whereupon the valve 106 returns again into the rest position, so that the hydraulic motor 90 is connected over the switching valve 106 and the check valve 116 with the piston chamber 100. The hydraulic motor 90 remains supplied with pressurized fluid until the pressure in the piston chamber 100 drops off. Furthermore, the accumulator 108 is connected over a relief valve 110 with the piston rod chamber 102, whose purpose consists of draining excess hydraulic fluid from the accumulator 108 into the tank when the switching valve 106 is in its operating position, and hence the accumulator 108 is connected only with the hydraulic motor 90. It could also be possible to omit the relief valve 110.

Furthermore, the electrical control unit 118 is connected with a height sensor 120 that is attached to the mast 12 and that detects the pivot angle of the lifting boom 16 about the bearing 14 (see FIG. 1). The height sensor 120 may be, for example, a potentiometer or an incremental angle transmitter which generates a signal relating to the relative angular disposition of the lifting boom 16 to the mast 12 and transmits this signal to the control unit 118. Angular regions are stored in memory in the electrical control unit 118, in which an actuation of the push-button switch 112 is ignored. Thereby, an activation of the hydraulic motor 90 can be prevented at inappropriate positions of the lifting boom 16, for example, if it is raised very far. The angular regions, in which the push-button switch 112 is ignored, can be permanently programmed or provided as input by the operator, particularly in the form of numerical values or in the form of inputs of push-button actuation or the like when the lifting boom 16 is in a position in which a corresponding angular region begins or ends.

A further latch position sensor 122 (see FIG. 2) interacts with the locking part 64 and detects whether it is in its locking position. In case the hydraulic motor 90 is not supplied with pressurized fluid, but the piston 100 of the further hydraulic cylinder 28 has been supplied with pressurized fluid and the locking part 64 should therefore be in its locking position, but the latch position sensor 122 does not detect it, the operator is supplied with a corresponding acoustic or visual warning signal, here shown as a light 123. The latch position sensor 122 can be in the form of a mechanical or magnetic switch or a light barrier to detect the locking part 64. The sensors 120 and 122 and the application of their signals must be accorded independent inventive significance.

Thereby, the switching arrangement of the hydraulic motor 90 makes it possible to activate the hydraulic motor 90 and to bring the locking bar 48 into its unlocking position and to arrest it there. Following this, the implement 20 can be deposited on the ground or any other desired deposit surface and subsequently another or the same implement 20 can be taken up and raised. Following this, the implement 20 can be tilted relative to the lifting boom 16 by means of the hydraulic motor 28, so that the hydraulic motor 90 is no longer supplied with pressurized fluid and is brought by the spring 96 into its rest position as shown in FIG. 2. Shortly thereafter, the stop 76 comes into contact with the lifting boom 16 and is pivoted into the region of the wider slot width. Once it reaches there, the spring 78 brings the locking bar 48 into the locking position. Simultaneously, the accumulator 108 is again filled. Accordingly, the securing of the implement 20 does not require the activation of any hydraulic device any more, making unnecessary the actuation of a key or switch push button.

Having described the preferred embodiment, it will become apparent that various modifications can be made without departing from the scope of the invention as defined in the accompanying claims.

What is claimed is:

1. In a combination including a lifting arm, an implement holder coupled to the lifting arm for movement about a first horizontal transverse axis, mounted to the implement holder by a connecting arrangement including an elongate locking bar carried by said implement holder and extending along a second horizontal transverse axis that is generally parallel to said first horizontal transverse axis, said locking bar being mounted for movement in a first direction along said second horizontal transverse axis between a locking position wherein it penetrates aligned openings respectively provided in said implement holder and said implement, and an unlocking position, wherein it is withdrawn from those of the aligned openings which are in said implement, said locking bar including a stop surface and being movable about said second horizontal transverse axis to an arrested position wherein said stop surface engages said implement holder and prevents said locking bar from moving back to said locking position, a hydraulic lock control cylinder coupled to said locking bar and being selectively pressurized for moving said locking bar from said locking position to said unlocking position, and an implement control cylinder coupled between said lifting arm and said implement holder for adjusting said implement relative to said lifting arm, the improvement comprising: a coupling arrangement establishing a one-way connection between said hydraulic lock control cylinder and said locking bar so that movement of said locking bar in said first direction occurs only during extension of said hydraulic lock control cylinder and so that said locking bar may be moved relative to said coupling arrangement to and from said arrested position; a biasing member located for yieldably retaining said hydraulic lock control cylinder in a collapsed state; said hydraulic lock control cylinder being a single-acting cylinder and being selectively pressurized for effecting extension of said cylinder for moving said locking bar from said locking position to said unlocking position, whereby said lock control cylinder may be depressurized when said locking bar is in said arrested position, with said biasing member acting to return said lock control cylinder to said collapsed state.

2. The combination, as defined in claim 1, wherein said locking bar is so located relative to said lifting arm that when said implement holder is moved to a pre-selected position relative to said lifting arm by said implement control actuator, the locking bar is engaged by said lifting arm and moved out of its arrested position; and a lock-effecting biasing arrangement being coupled between said locking bar and said implement holder for moving said locking bar from said unlocking position to said locking position when said hydraulic lock cylinder is depressurized at a time when said locking bar is in said unlocked position.

3. The combination, as defined in claim 1, and further including an accumulator for containing pressurized fluid; a switching valve coupled between said lock control cylinder and said accumulator and being selectively operable for connecting said accumulator to said lock control cylinder for effecting actuation of the latter when it is desired to move said locking bar to said unlocking position.

4. In a combination including a lifting arm, an implement holder coupled to the lifting arm for movement about a horizontal transverse axis, mounted to the implement holder by a connecting arrangement including an elongate locking bar carried by said implement holder and extending generally parallel to said axis, said locking bar being mounted for movement in a first direction between a locking position wherein it penetrates aligned openings respectively provided in said implement holder and said implement, and an unlocking position, wherein it is withdrawn from those of the aligned openings which are in said implement, an implement control cylinder coupled between said lifting arm and said implement holder for adjusting said implement relative to said lifting arm, the improvement comprising: said connecting arrangement further including a hydraulic lock control cylinder coupled to said locking bar; an accumulator for containing pressurized fluid; a switching valve coupled between said lock control cylinder and said accumulator and being selectively operable for connecting said accumulator to said lock control cylinder for effecting actuation of the latter for moving said locking bar from said locking position to said unlocking position; said locking bar including a stop surface and being movable to an arrested position wherein said stop surface engages said implement holder and prevents said locking bar from moving back to said locking position, whereby said lock control cylinder may be depressurized when said locking bar is in said arrested position; and a fluid coupling between said accumulator and one end of said implement control cylinder by way of said switching valve; and said switching valve being movable to a position separating said accumulator from said lock control cylinder; and said fluid coupling and switching valve being so constructed and arranged that pressurization of said implement control cylinder for effecting movement of said implement to effect contact between said locking bar and said lifting arm so as to cause said locking bar to be moved out of its arrested position results in pressure being coupled to said accumulator.

5. The combination, as defined in claim 4, wherein said lock control cylinder is connected to a low pressure side of said implement control cylinder when the latter is operating to move the implement to, in turn, effect movement of said locking bar from its arrested position.

6. The combination, as defined in claim 2, wherein said lock-effecting biasing arrangement includes at least one coil compression spring located between the locking bar and the implement holder that preloads the locking bar into the locking position.

7. The combination, as defined in claim 1, wherein said locking bar includes a section disposed parallel to, and offset from, said second horizontal transverse axis; said implement holder including an elongate slot formed at a radius about said second horizontal transverse axis and receiving said section of said locking bar; said slot having a first section of a first width joined to a second section having a width greater than that of said first section; said locking bar including a stop joined to said section of said locking bar and having a dimension that fits within and is received within said second section of said slot when said locking bar is in said locking position and is movable about said axis after said locking bar has been moved to said unlocking position so as to move said locking bar to said arrested position wherein said stop is removed from said slot and abuts said implement holder in the vicinity of said first section of said slot.

8. In a combination including a lifting arm, an implement holder coupled to the lifting arm for movement about a first horizontal transverse axis, an implement mounted to the implement holder by a connecting arrangement including an elongate locking bar carried by said implement holder and extending along a second horizontal transverse axis disposed generally parallel to said first horizontal transverse axis, said locking bar being mounted for movement in a first direction between a locking position wherein it penetrates aligned openings respectively provided in said implement holder and said implement, and an unlocking position, wherein it is withdrawn from those of the aligned openings which are in said implement, a hydraulic lock control cylinder coupled to said locking bar and being selectively pressurized for moving said locking bar from said locking position to said unlocking position, an implement control cylinder coupled between said lifting arm and said implement holder for adjusting said implement relative to said lifting arm, said locking bar including a section disposed parallel to, and offset from, said second horizontal transverse axis; said implement holder including an elongate slot formed at a radius about said second horizontal transverse axis and receiving said section of said locking bar; said slot having a first section of a first width joined to a second section having a width greater than that of said first section; said locking bar including a stop joined to said section of said locking bar and having a dimension that fits within and is received within said second section of said slot when said locking bar is in said locking position and is movable about said axis after said locking bar has been moved to said unlocking position so as to move said locking bar to said a arrested position wherein said stop is removed from said slot and abuts said implement holder in the vicinity of said first section of said slot, the improvement comprising: said connecting arrangement further including a spring coupled between said locking bar and said implement holder that automatically moves said locking bar to said arrested position once said locking bar has been moved to said unlocking position by said lock control cylinder.

9. In a combination including a lifting arm, an implement holder coupled to the lifting arm for movement about a horizontal transverse axis, mounted to the implement holder by a connecting arrangement including an elongate locking bar carried by said implement holder and extending generally parallel to said axis, said locking bar being mounted for movement in a first direction between a locking position wherein it penetrates aligned openings respectively provided in said implement holder and said implement, and an unlocking position, wherein it is withdrawn from those of the aligned openings which are in said implement, an implement control cylinder coupled between said lifting arm and said implement holder for adjusting said implement relative to said lifting arm, the improvement comprising: said connecting arrangement further including a hydraulic lock control cylinder coupled to said locking bar and being selectively pressurized for moving said locking bar from said locking position to said unlocking position; said locking bar including a stop surface and being movable to an arrested position wherein said stop surface engages said implement holder and prevents said locking bar from moving back to said locking position, whereby said lock control cylinder may be depressurized when said locking bar is in said arrested position; a control system for said lock control cylinder; said control system including an electrical control device; and electrically controlled valve coupled between a source of fluid pressure and said lock control cylinder; a manually operable control switch selectively operable for sending a control signal to said electrically controlled valve by way of said electrical control device; and a position sensor coupled to said lifting arm for sensing its position and sending a corresponding signal to said control device; and said control device being operable in response to a preselected range of positions of said lifting arm for inhibiting the signal sent by said control switch from reaching said electrically controlled valve.

10. In a combination including a lifting arm, an implement holder coupled to the lifting arm for movement about a horizontal transverse axis, an implement mounted to the implement holder by a connecting arrangement including an elongate locking bar carried by said implement holder and extending generally parallel to said axis, said locking bar being mounted for movement in a first direction between a locking position wherein it penetrates aligned openings respectively provided in said implement holder and said implement, and an unlocking position, wherein it is withdrawn from those of the aligned openings which are in said implement, said locking bar including a stop offset from said axis; said locking bar being mounted for pivoting about said axis between said unlocking position and an arrested position wherein said stop engages said implement holder and prevents movement of said locking bar to said locking position; an implement control cylinder coupled between said lifting arm and said implement holder for adjusting said implement relative to said lifting arm the improvement comprising: an arrest-effecting device coupled between said locking bar and said implement holder for automatically moving said locking bar into said arrested position after said lock cylinder has moved said locking bar to said unlocking position; and said locking bar, when in said arrested position, being so located relative to said lifting arm that movement of said implement holder by said implement control cylinder causes said locking bar to move out of said arrested position, whereby it is free to move back to said locking position; said connecting arrangement further including a hydraulic lock control cylinder coupled to said locking bar and being selectively pressurized for moving said locking bar from said locking position to said unlocking position; an accumulator; and a switching valve coupled between said accumulator and said lock control cylinder for selectively coupling said lock control cylinder to said accumulator, whereby the pressure in said accumulator acts to cause said lock control cylinder to move said locking bar to said unlocking position.

11. The combination, as defined in claim 10, wherein said switching valve is an electro-magnetically controlled valve; an electrical control circuit coupled to said valve and including a switch at an operator's station, whereby said electro-magnetically controlled valve can be remotely controlled over said switch from said operator's station.

12. The combination, as defined in claim 10, wherein said accumulator is coupled to a first chamber of said implement control cylinder so as to become charged with fluid when said implement control cylinder is actuated for moving said implement holder relative to said lifting arm so as to bring said locking bar, when in its arrested position, into engagement with said lifting arm.

13. The combination, as defined in claim 12, wherein said lock control cylinder is connected with a second chamber of said implement control cylinder so as to drain pressure from said lock control cylinder when said locking bar is being moved out of its arrested position by relative movement between said implement holder and said lifting arm.

14. The combination, as defined in claim 10, wherein a spring is mounted between said implement holder and said locking bar for biasing said locking bar towards said locking position.

15. The combination, as defined in claim 10 wherein said implement holder is provided with an elongate slot formed at a radius about said axis and having a first section of a first width joined to a second section having a width smaller than that of said first width; said stop being sized for passing through said first section of said slot but not through said second section of said slot and being located in said first section of said slot when said locking bar is in said locking position, and abutting said implement holder in the vicinity of said second section of said slot when said locking bar is in its arrested position.

16. The combination, as defined in claim 15, wherein said arrest effecting device includes an arresting spring coupled between said implement holder and said locking bar so as to automatically move said locking bar to said arrested position once said locking bar has been moved to said unlocking position.

17. In a combination including a lifting arm, an implement holder coupled to the lifting arm for movement about a horizontal transverse axis, an implement mounted to the implement holder by a connecting arrangement including an elongate locking bar carried by said implement holder and extending generally parallel to said axis, said locking bar being mounted for movement in a first direction between a locking position wherein it penetrates aligned openings respectively provided in said implement holder and said implement, and an unlocking position, wherein it is withdrawn from those of the aligned openings which are in said implement, an implement control cylinder coupled between said lifting arm and said implement holder for adjusting said implement relative to said lifting arm the improvement comprising: said connecting arrangement further including a hydraulic lock control cylinder coupled to said locking bar and being selectively pressurized for moving said locking bar from said locking position to said unlocking position; an accumulator; and a switching valve coupled between said accumulator and said lock control cylinder for selectively coupling said lock control cylinder to said accumulator, whereby the pressure in said accumulator acts to cause said lock control cylinder to move said locking bar to said unlocking position; and a control arrangement associated with said lock control cylinder which includes a manual input for effecting operation of said lock control cylinder and which further includes a sensing arrangement for detecting the position of said lifting arm for creating a signal which causes said manual input for controlling said lock control cylinder to be ignored when said lifting arm is located within a previously defined range of positions.

* * * * *